US011787741B2

(12) United States Patent
Karlsson et al.

(10) Patent No.: US 11,787,741 B2
(45) Date of Patent: Oct. 17, 2023

(54) METHOD FOR RECYCLING MINERAL WOOL, A METHOD FOR PRODUCTION OF ACOUSTICAL PANEL ELEMENTS AND SUCH AN ACOUSTICAL PANEL ELEMENT

(71) Applicant: SAINT-GOBAIN ECOPHON AB, Hyllinge (SE)

(72) Inventors: Ola Karlsson, Lund (SE); Torbjorn Persson, Helsingborg (SE)

(73) Assignee: SAINT-GOBAIN ECOPHON AB, Hyllinge (SE)

( * ) Notice: Subject to any disclaimer, the term of this patent is extended or adjusted under 35 U.S.C. 154(b) by 304 days.

(21) Appl. No.: 17/271,083

(22) PCT Filed: Aug. 28, 2019

(86) PCT No.: PCT/EP2019/072949
§ 371 (c)(1),
(2) Date: Feb. 24, 2021

(87) PCT Pub. No.: WO2020/048843
PCT Pub. Date: Mar. 12, 2020

(65) Prior Publication Data
US 2021/0317040 A1    Oct. 14, 2021

(30) Foreign Application Priority Data
Sep. 3, 2018  (EP) .................................. 18192260

(51) Int. Cl.
C04B 28/00    (2006.01)
C04B 14/42    (2006.01)
C04B 14/46    (2006.01)
C04B 16/06    (2006.01)
C04B 18/26    (2006.01)
C04B 40/00    (2006.01)
C04B 103/10   (2006.01)
C04B 111/00   (2006.01)
C04B 111/52   (2006.01)

(52) U.S. Cl.
CPC ............ C04B 28/006 (2013.01); C04B 14/42 (2013.01); C04B 14/4618 (2013.01); C04B 16/06 (2013.01); C04B 18/26 (2013.01); C04B 40/0046 (2013.01); C04B 2103/10 (2013.01); C04B 2111/00603 (2013.01); C04B 2111/00612 (2013.01); C04B 2111/52 (2013.01)

(58) Field of Classification Search
CPC ... C04B 28/006; C04B 14/42; C04B 14/4618; C04B 16/06; C04B 18/26; C04B 40/0046; C04B 2103/10; C04B 2111/00603; C04B 2111/00612; C04B 2111/52; C04B 30/02; C04B 14/46; C04B 28/00; C04B 40/00; B28C 5/00; Y02P 40/10; Y02W 30/91
See application file for complete search history.

(56) References Cited

U.S. PATENT DOCUMENTS

| 5,277,762 A * | 1/1994 | Felegi, Jr. ............... D21H 13/40 162/212 |
| 6,268,042 B1 * | 7/2001 | Baig ....................... C04B 26/28 428/326 |
| 2002/0096278 A1 | 7/2002 | Foster et al. |
| 2003/0041987 A1 | 3/2003 | Foster et al. |
| 2016/0318803 A1 | 11/2016 | Pianaro et al. |
| 2021/0317046 A1 | 10/2021 | Karlsson et al. |

FOREIGN PATENT DOCUMENTS

| DE | 10 2006 028 837 A1 | 12/2006 |
| EP | 3 085 676 A1 | 10/2016 |
| EP | 3 617 172 A1 | 3/2020 |
| RU | 2 622 283 C2 | 6/2017 |
| WO | WO 90/07473 A1 | 7/1990 |
| WO | WO 2020/048843 A | 3/2020 |

OTHER PUBLICATIONS

Canadian Office Action and Search Report dated Jul. 21, 2022 in Canadian Patent Application No. 3,111,003, 3 pages.
International Search Report dated Sep. 30, 2019 in PCT/EP2019/072949 filed Aug. 28, 2019.
Christiansen, M., "An Investigation of Waste Glass-Based Geopolymers Supplemented with Alumina", Michigan Technological University, XP-002772443, 2013, 32 total pages.
Cyr, M., et al., "Properties of inorganic polymer (geopolymer) mortars made of glass cullet", J Mater Sci, vol. 47, XP035004006, DOI 10.1007/s10853-011-6107-2, 2012, pp. 2782-2797.
English translation of Decision on Granting dated Dec. 3, 2021 in Russian Patent Application No. 2021103729/03, 4 pages

* cited by examiner

Primary Examiner — Anthony J Green
(74) Attorney, Agent, or Firm — Oblon, McClelland, Maier & Neustadt, L.L.P.

(57) ABSTRACT

An acoustical geopolymer panel element includes a layer including a fibre component and a geopolymer binder made from a mixture including ground mineral wool, and an additional layer including mineral wool. The layer including a fibre component and a geopolymer binder has a density in the range of 20-400 kg/m$^3$, a porosity in the range of 0.75-0.99 and a thickness in the range of 5-75 mm. The ground mineral wool may be ground glass or stone wool and the fibre component may be a wood fibre component, a polymer fibre component and/or a mineral wool component. Further, a geopolymer mixture is provided upon recycling mineral wool which is ground to powder and mixed with an alkali activator component. Additionally, a method for producing acoustical geopolymer panel elements includes grinding elements including mineral wool for provision of a powder component.

17 Claims, 2 Drawing Sheets

METHOD FOR RECYCLING MINERAL WOOL, A METHOD FOR PRODUCTION OF ACOUSTICAL PANEL ELEMENTS AND SUCH AN ACOUSTICAL PANEL ELEMENT

FIELD OF THE INVENTION

The present invention relates to a method for recycling mineral wool, a method for producing an acoustical panel element and such a panel element. More specifically, the invention relates to producing an acoustical panel element in the form of a geopolymer panel element.

BACKGROUND ART

Elements comprising mineral wool may be used for a variety of purposes. For instance, the elements comprising mineral wool may constitute acoustical panel elements and may be formed as horizontally arranged ceiling tiles, vertically arranged baffle elements, wall mounted elements or free standing screens. Alternatively, the elements may be formed as thermal insulation elements.

The mineral wool may be in the form of glass or stone wool.

The use of elements comprising mineral wool results in the generation of considerable amounts of waste.

The waste may be generated during manufacturing of the elements comprising mineral wool and may comprise rejected elements or removed sections during shaping of the elements.

Waste may also be generated during installation of a system of elements comprising mineral wool. The waste at this stage may comprise sections removed from elements during trimming or elements remaining after completed installation.

Finally, waste may be generated after end of life when the system of elements comprising mineral wool is demounted.

Conventionally, waste in the form of elements comprising mineral wool generated during manufacturing, installation or demounting after end of life has been difficult to recycle in an efficient manner.

EP3085676 discloses a method for production of geopolymer slabs using recycled glass.

Another type of well known panel element is the so-called wood-wool cement board. This type of panel element is made of ordinary Portland cement mixed with wood-wool, for instance spruce-wood wool. The wood-wool cement board has thermal insulating and sound absorbing properties, and also exhibit resistance to bio-degradation and fire. However, some wood extractives, such as sugar, may have a negative impact on the setting of the cement and thereby result in boards with poor mechanical properties. Also, the wood-wool cement board has a high environmental impact since the cement component in the board is associated with a high $CO_2$ footprint.

SUMMARY OF THE INVENTION

In view of that stated above, it is an object of the present invention to provide a method for recycling waste in the form of elements comprising mineral wool generated during manufacturing, installation or demounting after end of life. It is also an object to provide a method for producing acoustical panel elements from the recycled mineral wool and to provide a corresponding acoustical panel element.

To achieve at least one of the above objects and also other objects that will be evident from the following description, an acoustical geopolymer panel element having the features defined in claim 1, a method for recycling mineral wool having the features defined in claim 4 and a method for production of acoustical geopolymer panel elements having the features defined in claim 7 are provided according to the present invention. Preferred embodiments will be evident from the dependent claims.

More specifically, there is provided according to a first aspect of the present invention an acoustical geopolymer panel element comprising a layer comprising a fibre component and a geopolymer binder comprising ground mineral wool, wherein the acoustical panel element has a density in the range of 20-400 $kg/m^3$, a porosity in the range of 0.75-0.99 and a thickness in the range of 5-75 mm.

The geopolymer binder comprises ground or milled mineral wool and is thus possible to produce from recycled mineral wool.

By using ground or milled mineral wool in the geopolymer binder, a robust panel element may be obtained having a low environmental impact with a low $CO_2$ footprint.

The presence of the fibre component and the porosity of layer of the panel element ensures a relatively low density in the range of 20-400 $kg/m^3$, which makes the panel element useful in various systems, such as a suspended ceiling system.

The presence of a fibre component and the porosity of the layer of the acoustical panel element also results in a product having good sound absorbing properties.

According to an embodiment, the mineral wool may be glass or stone wool.

According to another embodiment, the fibre component, which may be obtained from a recycled material, may be a wood fibre component, such as a wood-wool component, a polymer fibre component, such as a PET fibre component, and/or a mineral wool component. If two or more types of fibres are used, the fibre types may have substantial different fibre diameter or cross section thereby creating a double porosity structure in the panel element improving the sound absorbing property.

According to yet another embodiment, the geopolymer panel element may comprise an additional layer comprising mineral wool. By adding an additional layer to the panel element, the sound absorbing properties of the panel element may be improved. The additional layer may be in the form of a recycled panel element comprising mineral wool. The additional layer may be arranged at a side of the panel element corresponding to a not visible side or a rear side of the panel element.

According to a second aspect of the present invention, a method for recycling mineral wool is provided, comprising grinding elements comprising mineral wool for provision of a powder component, and mixing the powder component and an alkali activator component for provision of a geopolymer mixture.

Hereby, an improved method for recycling mineral wool is provided. The mineral wool may be in the form of recovered waste generated during manufacturing, installation or demounting after end of life of elements comprising mineral wool.

The geopolymer mixture may be activated in connection with mixing of the powder component with the alkali activator component, for instance by adding water. The water may as a non-limiting example be added by diluting the alkali component in the water and subsequently mixing the powder component with the powder component.

Alternatively, the geopolymer mixture may be preserved in a non-activated state until time of use.

The presence of surface layer attached to the elements comprising mineral wool may be removed prior to the step of grinding the elements. Hereby, a possible negative impact from the surface layer material to reaction between the powder component and the alkali activator component after activation is eliminated.

According to another embodiment, the method may further comprise neutralization of any binder agent present in the mineral wool. Hereby, a possible negative impact from the binder agent to reaction between the powder component and the alkali activator component after activation is eliminated. The neutralization may be a washing process or a heating process. Alternatively, the neutralization may be accomplished by adding an agent inhibiting the negative impact of the binder.

According to a third embodiment of the present invention, a method for production of acoustical geopolymer panel elements is provided, the method comprising grinding elements comprising mineral wool for provision of a powder component, mixing the powder component with an alkali activator component for provision of a geopolymer mixture, mixing the geopolymer mixture with a fibre component, forming the mixture into acoustical geopolymer panel elements, and activating the mixture.

Hereby an improved method for production of robust acoustical panel elements having a low environmental impact is provided.

The provision of a powder component from ground or milled elements comprising mineral wool enables utilization of recovered waste generated during manufacturing, installation or demounting after end of life of elements comprising mineral wool.

The powder component and the alkali activator component is used for provision of a geopolymer mixture enabling production of robust panel elements.

The inclusion of a fibre component makes it possible to obtain a desired density of the panel element, such as in the range of 20-400 kg/m$^3$.

According to an embodiment, the step of activating the geopolymer mixture may be made by means of water. The mass ratio between water and the powder component may be 1:3-4. The water may be added prior, during or after the step of forming the geopolymer mixture into panel elements.

According to another embodiment, the step of forming the geopolymer mixture into acoustical geopolymer elements may be performed as an intermittent moulding process or as a continuous feeding process.

According to yet another embodiment, the step of grinding elements comprising mineral wool may be performed such that the powder component comprises mineral wool fibre fragments having an average fibre length in the range of 20-150 μm, more preferably 30-60 μm, and an average mineral wool fibre width in the range of 5-25 μm, more preferably 5-10 μm.

The mineral wool may be in the form of stone or glass wool.

According to yet another embodiment, the alkali activator component may be selected from the group consisting of NaOH, K-Silicate, $K_2CO_3$, Na-Aluminate, KOH, LiOH, Na-Silicate or $CA(OH)_2$.

According to yet another embodiment, the fibre component may be a wood fibre component, a polymer fibre component and/or a mineral wool component. The fibre component may be obtained from a recycled material.

According to yet another embodiment, the step of activating the geopolymer mixture may be performed prior to the step of forming the geopolymer mixture into acoustical elements.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

The invention is based on the realization that elements comprising mineral wool may be recycled and used as a component in production of acoustical geopolymer panel elements.

The term geopolymer, or alkali activated material, refers to an inorganic material that form long-range, covalently bonded, non-crystaline networks.

Figure 1:
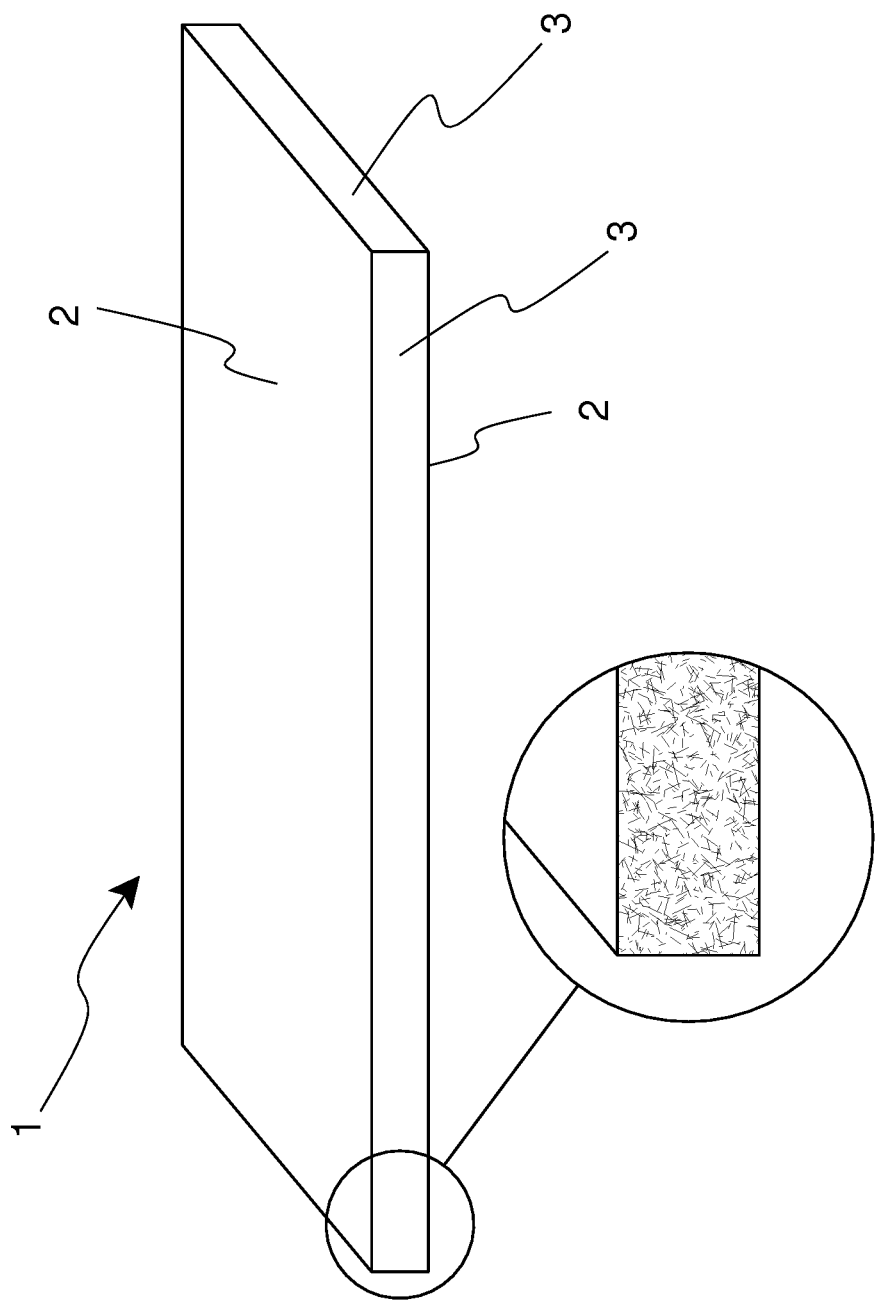
FIG. 1 is a schematic perspective view of an acoustical geopolymer panel element in accordance with an embodiment.

In FIG. 1, an acoustical geopolymer panel element 1 is illustrated.

In the shown embodiment, the panel element 1 comprises two opposing major surfaces 2 and four side surfaces 3 extending between the two opposing major surfaces 2.

The acoustical geopolymer panel element 1 may be used as a horizontally arranged ceiling tile, a vertically arranged baffle element, a wall mounted element or a free standing screen.

In the shown embodiment, the panel element 1 comprises a single layer.

The layer of the panel element 1 may have a density in the range of 20-400 kg/m$^3$.

The porosity of the layer of the panel element 1 may be in the range of 0.75-0.99. The porosity Ø, or the void fraction, of a material is a measurement of the empty space in a material and is calculated as the relationship between the volume of the void $V_V$, i.e. the empty space in the material, and the total volume of the material $V_T$:

$$\emptyset = V_V/V_T$$

The porosity is thus a fraction between 0 and 1 and may also be represented in percent by multiplying the fraction by 100.

The layer of the panel element 1 may have a thickness in the range of 5-75 mm.

The layer of the panel element 1 comprises a fibre component and a geopolymer binder comprising ground or milled mineral wool.

The mineral wool may be obtained from recycled elements comprising mineral wool in the form of glass or stone wool.

The ground or milled mineral wool in the panel element 1 has undergone a chemical reaction together with an alkali activator component thereby forming an geopolymer binder.

The fibre component is embedded in the geopolymer binder as evident from the detached enlargement of FIG. 1 and may be a wood fibre, such as wood-wool, a polymer fibre, such as a PET fibre and/or a mineral wool component. The fibre component may be oriented or non-oriented. By using a fibre component comprising different types of fibres having substantial different fibre diameter or cross section area, such as wood-wool and mineral wool, a double porosity structure may be obtained improving the sound absorbing properties of the layer included in the panel element.

In accordance with the present invention, the acoustical geopolymer panel element may comprise additional layers.

An additional layer may for instance comprise mineral wool. Hereby, the sound absorbing properties of the panel element may be further improved. In such a case, the layer comprising the fibre component and a geopolymer binder comprising ground mineral wool may have at thickness in the range of 5-20 mm and the additional layer may have a density in the range of 15-45 $kg/m^3$. The additional layer may be obtained from recycled elements comprising mineral wool. The additional layer may be arranged on a side of the panel element corresponding to a not visible side of the panel element, i.e. a rear side of the panel element which is not intended to face a room when installed.

Figure 2:
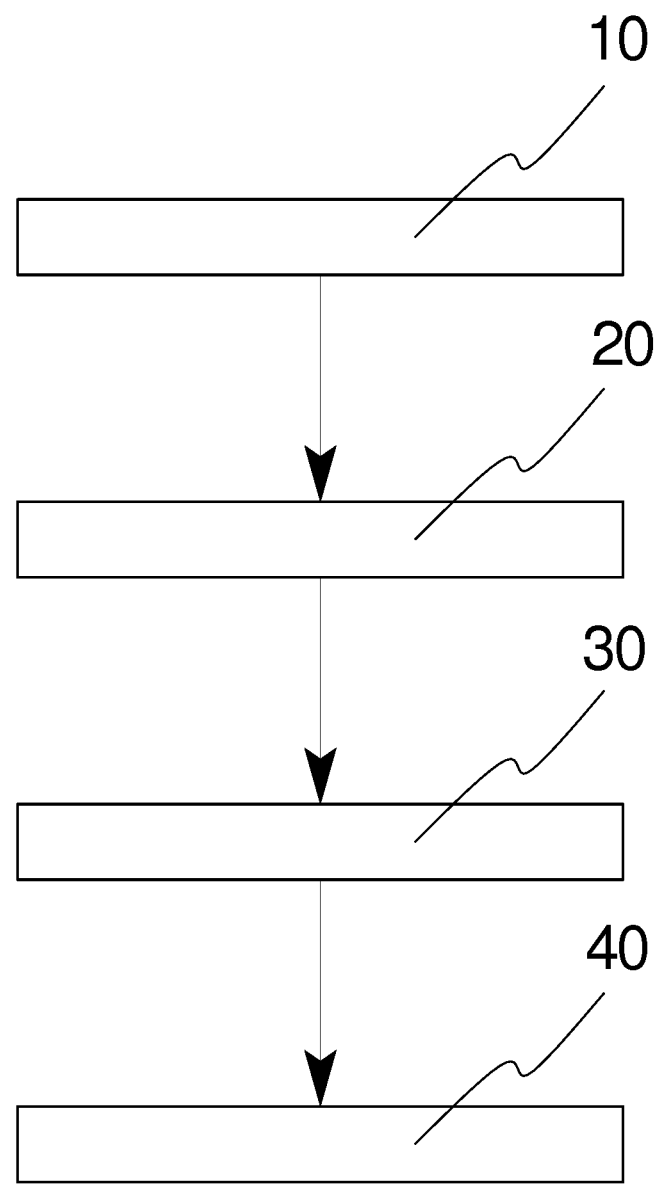
FIG. 2 is block scheme illustrating a method for producing acoustical geopolymer panel elements in accordance with an embodiment.

A method for production of acoustical geopolymer panel elements will now be described with reference to FIG. 2.

In step 10 of the method, recycled elements comprising mineral wool are ground or milled for provision of a powder component.

The recycled elements normally constitute waste generated during manufacturing, installation or demounting after end of life of elements comprising mineral wool. The mineral wool may be glass or stone wool.

The recycled elements may comprise surface layers which may be removed prior to the grinding.

The grinding or milling of the recycled panel elements may be performed by a vibratory disc mill or a ball mill.

During the grinding of the mineral wool, the fiber length of the fibres forming the mineral wool is reduced. The powder component may after grinding have an average mineral wool fibre length of 20-150 µm, more preferably 30-60 µm and an average mineral wool fiber width of 5-25 µm, more preferably 5-10 µm. The tapped density of the powder component may be in the range of 900-1 200 $kg/m^3$.

In step 20 of the method, the powder component is mixed with an alkali activator component for the provision of a geopolymer mixture. In accordance with an embodiment, a fibre component may also be added to the mixture. The fibre component may be added prior, during or after mixing of the powder component with the alkali activator component.

The mixing may be performed in batches or in a continuous process or in a combination thereof. For instance, the powder component and the alkali activator component may be mixed in batches, and subsequently mixed with the fibre component in a continuous process.

The alkali activator component may be NaOH, K-Silicate, $K_2CO_3$, Na-Aluminate, KOH, LiOH, Na-Silicate or $CA(OH)_2$.

The fibre component may be wood fibre, such as wood wool, polymer fibre, such as a PET fibre, or mineral wool. The fibre component in the form of wood wool may have a fibre length in the range of 80-250 mm, a fibre width in the range of 2-12 mm and a fibre thickness in the range of 0.2-1 mm.

In step 30, the geopolymer mixture is formed into acoustical geopolymer panel elements.

The step of forming the geopolymer mixture may be performed as an intermittent moulding process, for instance by arranging the geopolymer mixture in moulds and kept therein until the geopolymer is sufficiently cured.

Alternatively, the geopolymer mixture may be performed as a continuous feeding process, for instance by feeding the geopolymer mixture onto a conveyor thereby forming an endless web which subsequently after sufficient curing may be converted into acoustical geopolymer panel elements of desired shape and size.

In step 40, the geopolymer mixture is activated. Hereby a curing process is initiated forming the geopolymer binder having long-range, covalently bonded, non-crystaline networks.

The curing time may be several days or even weeks, and thus the step 40 of activating the geopolymer mixture may be performed prior, during or after the step 30 of forming of the geopolymer mixture into acoustical geopolymer panel elements.

The step of activating the geopolymer may for instance be performed during the step 20 of mixing the powder component is with the alkali activator component for the provision of the geopolymer mixture.

The activating of the geopolymer mixture may be made by means of water.

When water is added during step 20, i.e. when mixing the powder component with the alkali activator component and possible the fibre component, the alkali activator component may for instance be diluted in water and the solution may subsequently be mixed with the powder component thereby initiating the geopolymer formation process.

The mass ratio between water and the powder component may be 1:3-4.

The recycled elements comprising mineral wool may also comprise a binder, such as a phenol formaldehyde urea resin. The binder may have a negative impact on the chemical process when the geopolymer mixture is activated. Thus, in accordance with an embodiment of the present invention, the method may comprise an additional step where the binder is neutralized. The neutralization of the binder may be by removal of the binder from the mineral wool, for instance by a washing process or a heating process. Alternatively, the neutralization may be performed by adding an agent inhibiting the negative impact of the binder. Thus, the neutralization step is dependent on the specific type of binder at hand. For instance, for a binder in the form of a phenol formaldehyde urea resin, neutralization of the binder may be best achieved by a heating process in which the binder is burnt.

It will be appreciated that the present invention is not limited to the embodiments shown. Several modifications and variations are thus conceivable within the scope of the invention which thus is exclusively defined by the appended claims.

The invention claimed is:

1. An acoustical geopolymer panel element comprising:
   a layer comprising a fibre component and a geopolymer binder comprising ground mineral wool, and
   an additional layer comprising mineral wool,
   wherein the layer comprising a fibre component and a geopolymer binder has a density in the range of 20-400 kg/m$^3$, a porosity in the range of 0.75-0.99 and a thickness in the range of 5-75 mm.

2. The acoustical geopolymer panel element according to claim 1, wherein the ground mineral wool is ground glass or stone wool.

3. The acoustical geopolymer panel element according to claim 1, wherein the fibre component is a wood fibre component, a polymer fibre component and/or a mineral wool component.

4. A method for recycling mineral wool, comprising:
   grinding elements comprising mineral wool for provision of a powder component, and
   mixing the powder component and an alkali activator component for provision of a geopolymer mixture.

5. The method according to claim 4, further comprising removing any surface layer attached to the elements comprising mineral wool prior to the grinding the elements.

6. The method according to claim 4, further comprising neutralization of any binder present in the mineral wool.

7. A method for production of acoustical geopolymer panel elements, comprising:
   grinding elements comprising mineral wool for provision of a powder component,
   mixing the powder component with an alkali activator component for provision of a geopolymer mixture,
   mixing the geopolymer mixture with a fibre component,
   forming the mixture into acoustical geopolymer panel elements, and
   activating the mixture.

8. The method according to claim 7, wherein the activating the geopolymer mixture is made by water.

9. The method according to claim 7, wherein the forming the geopolymer mixture into acoustical geopolymer elements is performed as an intermittent moulding process or as a continuous feeding process.

10. The method according to claim 7, wherein the powder component comprises mineral wool fibre fragments having an average fibre length in the range of 20-150 μm.

11. The method according to claim 7, wherein the powder component comprises mineral wool fibre fragments having an average fibre width in the range of 5-25 μm.

12. The method according to claim 7, wherein the ground elements comprise mineral wool in the form of stone or glass wool.

13. The method according to claim 7, wherein the alkali activator is selected from the group consisting of NaOH, K-Silicate, $K_2CO_3$, Na-Aluminate, KOH, LiOH, Na-Silicate or $CA(OH)_2$.

14. The method according to claim 7, wherein the fibre component is a wood fibre component, a polymer fibre component and/or a mineral wool component.

15. The method according to claim 7, wherein the activating the geopolymer mixture is performed prior to the forming the geopolymer mixture into acoustical elements.

16. The method according to claim 10, wherein the average fibre length is in the range of 30-60 μm.

17. The method according to claim 11, wherein the average fibre width is in the range of 5-10.

* * * * *